United States Patent
Sofia

(10) Patent No.: US 10,248,437 B2
(45) Date of Patent: *Apr. 2, 2019

(54) ENHANCED COMPUTER PERFORMANCE BASED ON SELECTABLE DEVICE CAPABILITIES

(71) Applicant: International Business Machines Corporation, Armonk, NY (US)

(72) Inventor: Anthony T. Sofia, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,055

(22) Filed: May 22, 2018

(65) Prior Publication Data

US 2018/0267814 A1    Sep. 20, 2018

Related U.S. Application Data

(63) Continuation of application No. 14/829,744, filed on Aug. 19, 2015, now Pat. No. 10,019,270.

(51) Int. Cl.
| | |
|---|---|
| *G06F 3/00* | (2006.01) |
| *G06F 9/445* | (2018.01) |
| *G06F 11/30* | (2006.01) |
| *G06F 11/34* | (2006.01) |
| *G06F 9/50* | (2006.01) |
| *G06F 3/06* | (2006.01) |

(52) U.S. Cl.
CPC ........ *G06F 9/44505* (2013.01); *G06F 9/5027* (2013.01); *G06F 11/3024* (2013.01); *G06F 11/3409* (2013.01); *G06F 3/0632* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 8,423,584 B2 * | 4/2013 | Bavaria | G06F 9/4411 707/803 |
| 9,471,339 B1 | 10/2016 | Sofia | |
| 9,606,816 B2 | 3/2017 | Sofia | |

(Continued)

OTHER PUBLICATIONS

IBM "List of IBM Patents or Patent Applications Treated as Related; (Appendix P)", Filed May 22, 2018, 2 pages.

*Primary Examiner* — Henry Tsai
*Assistant Examiner* — Dean Phan
(74) *Attorney, Agent, or Firm* — Cantor Colburn LLP; William Kinnaman

(57) ABSTRACT

An aspect includes receiving, by a processor, a capability indicating one or more performance aspects capable of being rendered by at least one hardware device of a computer system, determining a total number of hardware devices in the system, and determining a total number of the hardware devices having the capability. Upon determining, by the processor, that the total number of hardware devices in the system matches the total of the hardware devices having the capability, the capability is enabled for each of the hardware of the system with respect to a corresponding performance aspect.

17 Claims, 4 Drawing Sheets

(56) References Cited

U.S. PATENT DOCUMENTS

| | | | |
|---|---|---|---|
| 2005/0071519 A1* | 3/2005 | Hart | G06K 15/00 710/8 |
| 2008/0027565 A1* | 1/2008 | Erva | G01B 11/24 700/1 |
| 2009/0265707 A1* | 10/2009 | Goodman | G06F 9/5016 718/1 |
| 2011/0161972 A1* | 6/2011 | Dillenberger | G06F 9/5044 718/104 |
| 2017/0052796 A1 | 2/2017 | Sofia | |

* cited by examiner

ENHANCED COMPUTER PERFORMANCE BASED ON SELECTABLE DEVICE CAPABILITIES

DOMESTIC PRIORITY

This application is a continuation of U.S. patent application Ser. No. 14/829,744, filed Aug. 19, 2015, the disclosure of which is incorporated by reference herein in its entirety.

BACKGROUND

The present invention relates generally to computer processing, and more specifically, to providing enhanced computer performance based on selectable device capabilities.

SUMMARY

According to embodiments of the present invention, a method, system, and computer program product are provided for enhanced computer performance. The method includes receiving, by a processor, a capability indicating one or more performance aspects capable of being rendered by at least one hardware device of a computer system, determining a total number of hardware devices in the system, and determining a total number of the hardware devices having the capability. Upon determining, by the processor, that the total number of hardware devices in the system matches the total of the hardware devices having the capability, the capability is enabled for each of the hardware devices of the system with respect to a corresponding performance aspect.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Computer systems often include components that provide accelerated processing for certain functions. For example, applications that perform data-intensive operations may require accelerated processing techniques that are specifically configured to facilitate the handling of data-intensive tasks. These components may have varying capabilities in terms of processing speed, bandwidth, and data compression ratios. In some instances, by way of non-limiting example, a newly updated version of a hardware device may be capable of performing data compression more effectively, as defined by compression ratio, and may also be capable of performing data compression at a different compression ratio specified by its earlier version. In some computer systems, there may be a multitude of different hardware devices subject to different versions and thus, different performance capabilities. As used herein, a capability of a hardware device indicates one or more performance aspects capable of being rendered by the component. For example, a first version of a component may provide data compression ratios up to a certain amount while another version may provide higher data compression ratios than the first version.

Some computer systems require a high availability profile (e.g., under a service level agreement) in terms of a minimum number of redundant hardware devices to ensure a consistent level of computing performance and availability. Further, in some cases, a new capability of a hardware device may be enabled by a software license. In accordance with an exemplary embodiment, enhanced computer performance based on selectable device capabilities is provided. The embodiments described herein enable user-configurable settings based on the above-mentioned factors, which can enable selected capabilities of system hardware devices operating in a computer system.

Figure 1:
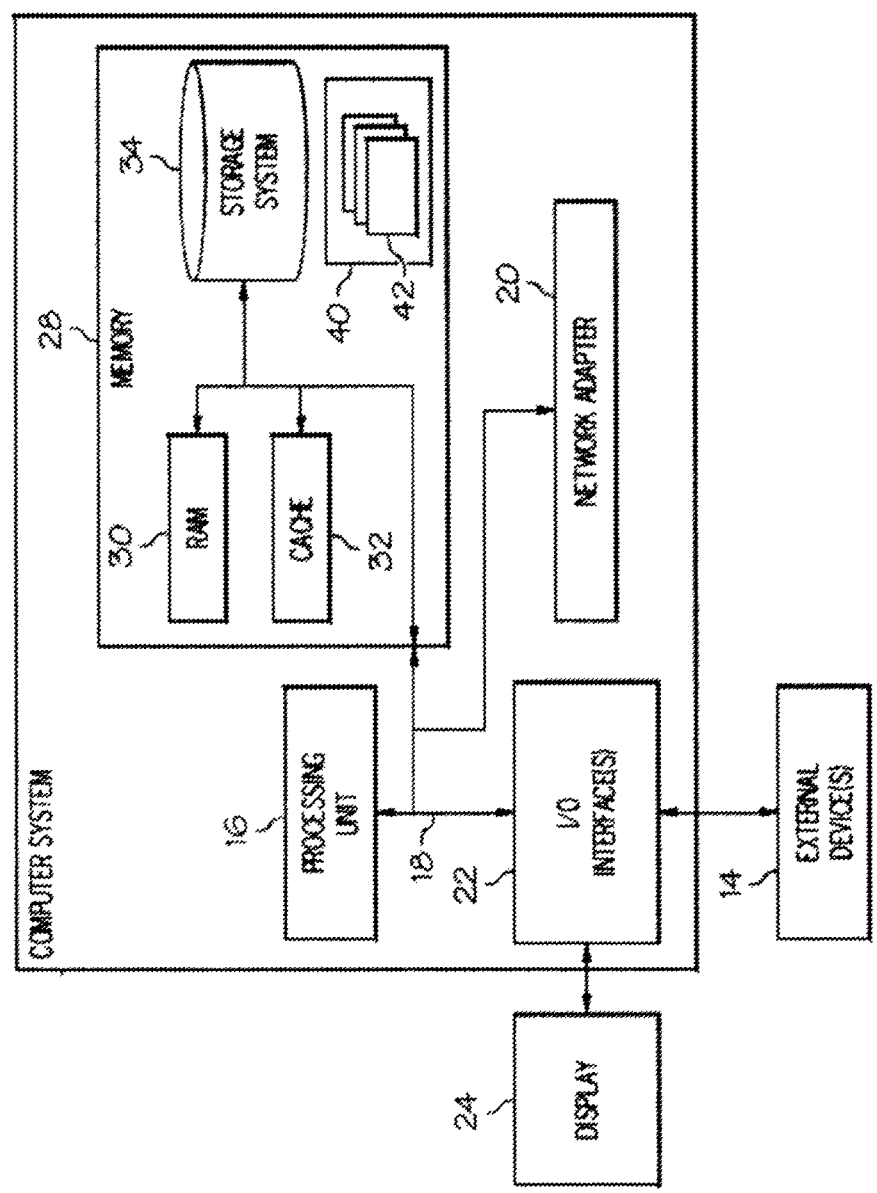
FIG. 1 depicts a block diagram of a computer system in accordance with an embodiment.

Referring now to FIG. 1, a block diagram of a computer system 10 for which enhanced computer performance techniques may be implemented is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
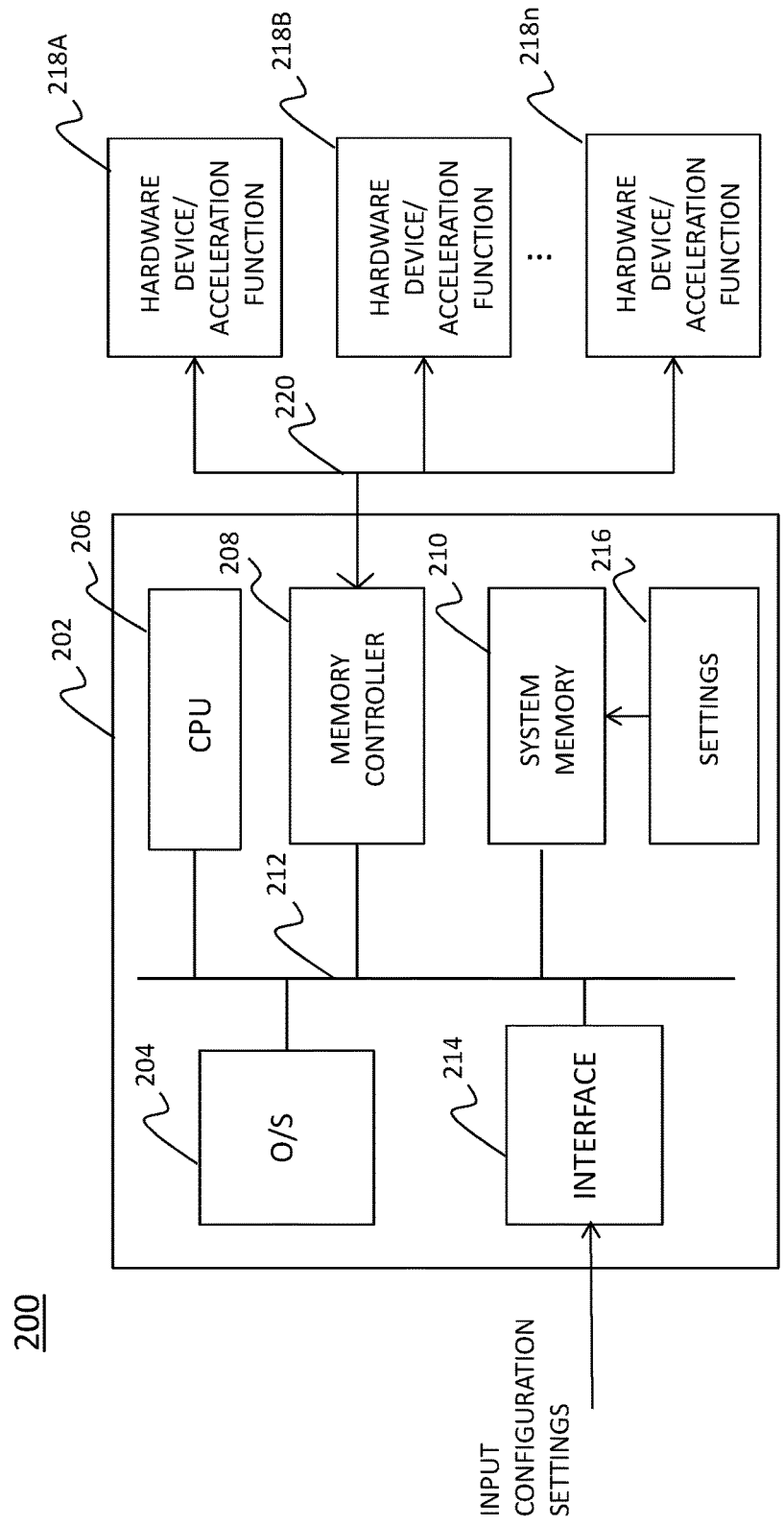
FIG. 2 depicts a block diagram of a computer system including hardware devices having acceleration components in accordance with an embodiment.

With reference to FIG. 2, a block diagram of a system 200 including an interface and off-board hardware devices of an embodiment are generally shown. According to an embodiment, a host system 202 includes an operating system 204, CPU 206, memory controller 208, and system memory 210, each of which is coupled to a system bus 212. In one embodiment, the operating system 204 (e.g., one of programs 40 in FIG. 1) is configured to facilitate the exemplary enhanced computer performance techniques described herein. Alternatively, the enhanced computer performance techniques may be implemented as a separate program or program module 42.

The host system 202 includes an interface 214 through which a user may input configuration settings. For example, the user may be presented with options on the display (e.g., display 24 of FIG. 1 and one or more I/O interfaces 22) for inputting or selecting various device capabilities, as will be described further herein. These settings may be stored in the system memory 210, e.g., as settings 216.

The system 200 also includes hardware devices 218A-218n, which may comprise, e.g., at least a portion of the external devices 14 shown in FIG. 1. The hardware devices 218A-218n are communicatively coupled to the memory controller 208 through a bus 220, which may be PCIe-compliant. The hardware devices 218A-218n may be implemented as various off-board devices, such as a video card or network adapter. Each of the hardware devices 218A-218n may include an accelerator processor that is configured to enhance the overall operation of the system 200 through, e.g., increased transmission speed, increased bandwidth, and data compression techniques. It will be understood that the system 200 may be updated with new hardware devices 218 as each device 218 becomes outdated in terms of its performance and when new and better-performing devices become developed. The capabilities of these devices 218 may be determined by the system 200 as a function of their respective version identifiers. For example, a hardware device 218A having an accelerator processor with a version ID of 1.0 may be a 4 GB network card, while a hardware device 218B having an accelerator processor with a version ID of 2.0 may be an 8 GB jump drive. The operating system 204 acquires this version information, as well as other hardware device information when, e.g., a hardware device is plugged in or the system 200 is powered on. In the above example, the hardware device 218B may be determined to have a more desirable capability in terms of system performance (e.g., its ability to perform data compression) than the hardware device 218A.

While only a single host system 202 is shown for simplicity, it will be understood that the enhanced computer performance techniques are not limited to a single host environment. It will be understood that the enhanced computer performance techniques may be extended to a network of host systems, including associated network resources, such as for example, in a cloud environment.

As indicated above, different hardware devices 218 may have varying capabilities, e.g., in terms of transmission speed, bandwidth, and data compression ratios. Using data compression as an example, a hardware device 218 having an updated version may be capable of performing data compression at the rate specified by the updated version, and may alternatively be capable of performing data compression at a rate specified by its earlier version. In some computer systems, there may be a multitude of different hardware devices 218 subject to different versions and thus, different data compression ratios. Likewise, there may be a multitude of different hardware devices 218 that perform different acceleration functions based on, e.g., their configured function (e.g., graphics, specialized mathematical, cryptographic, etc.). In addition, some computer systems require a high availability profile in terms of a minimum number of redundant hardware devices to ensure a consistent level of computing performance. Further, in some cases, a new capability of a hardware device 218 may be enabled by a software license. The enhanced data compression techniques enable a user to configure various settings based on the above-mentioned factors. These configurable settings will now be described with regard to FIG. 3.

Figure 3A:
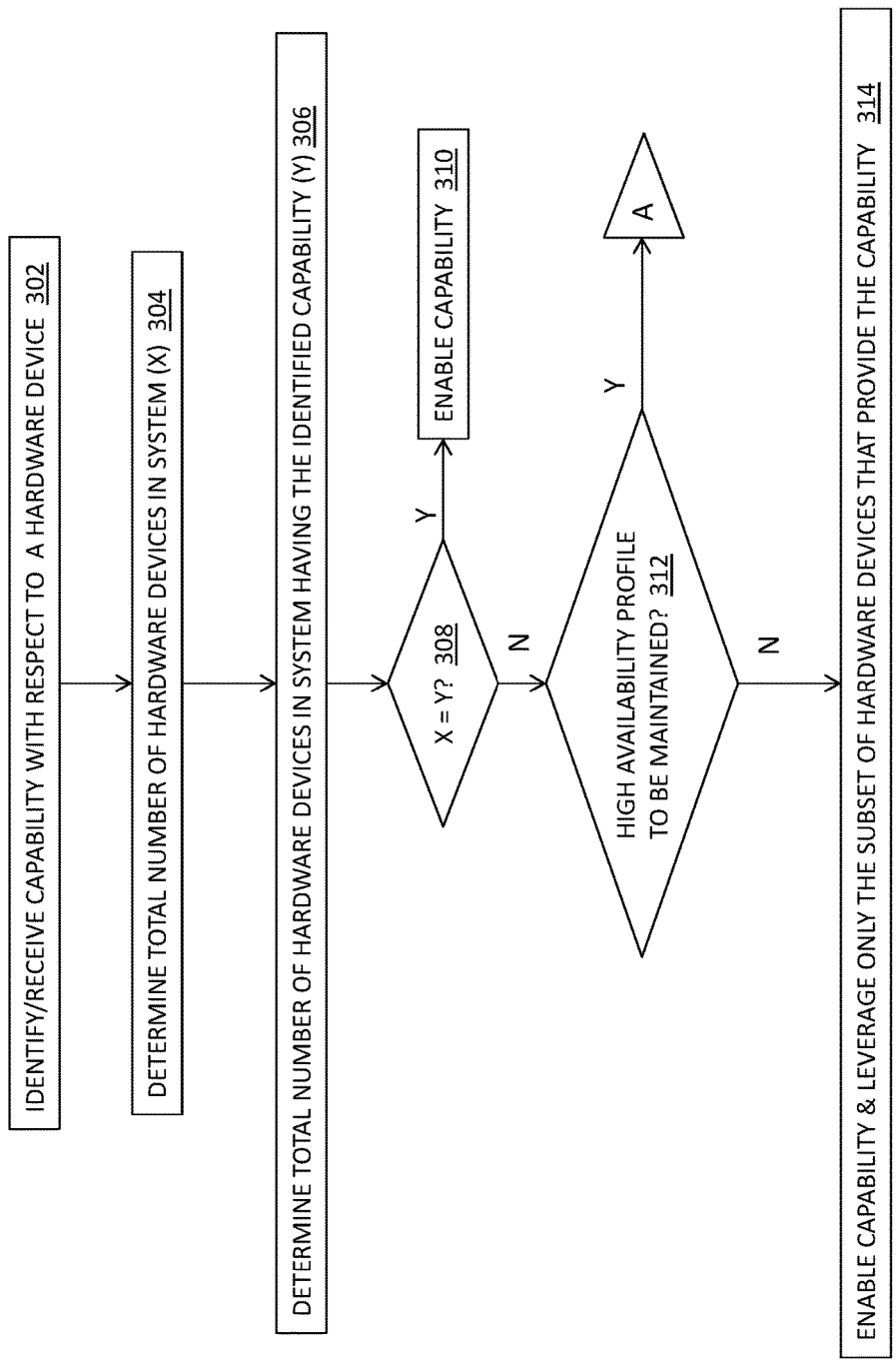
FIGS. 3A-3B depict a flow diagram of a process for enhanced computer performance based on selectable device capabilities in accordance with an embodiment.
Figure 3B:
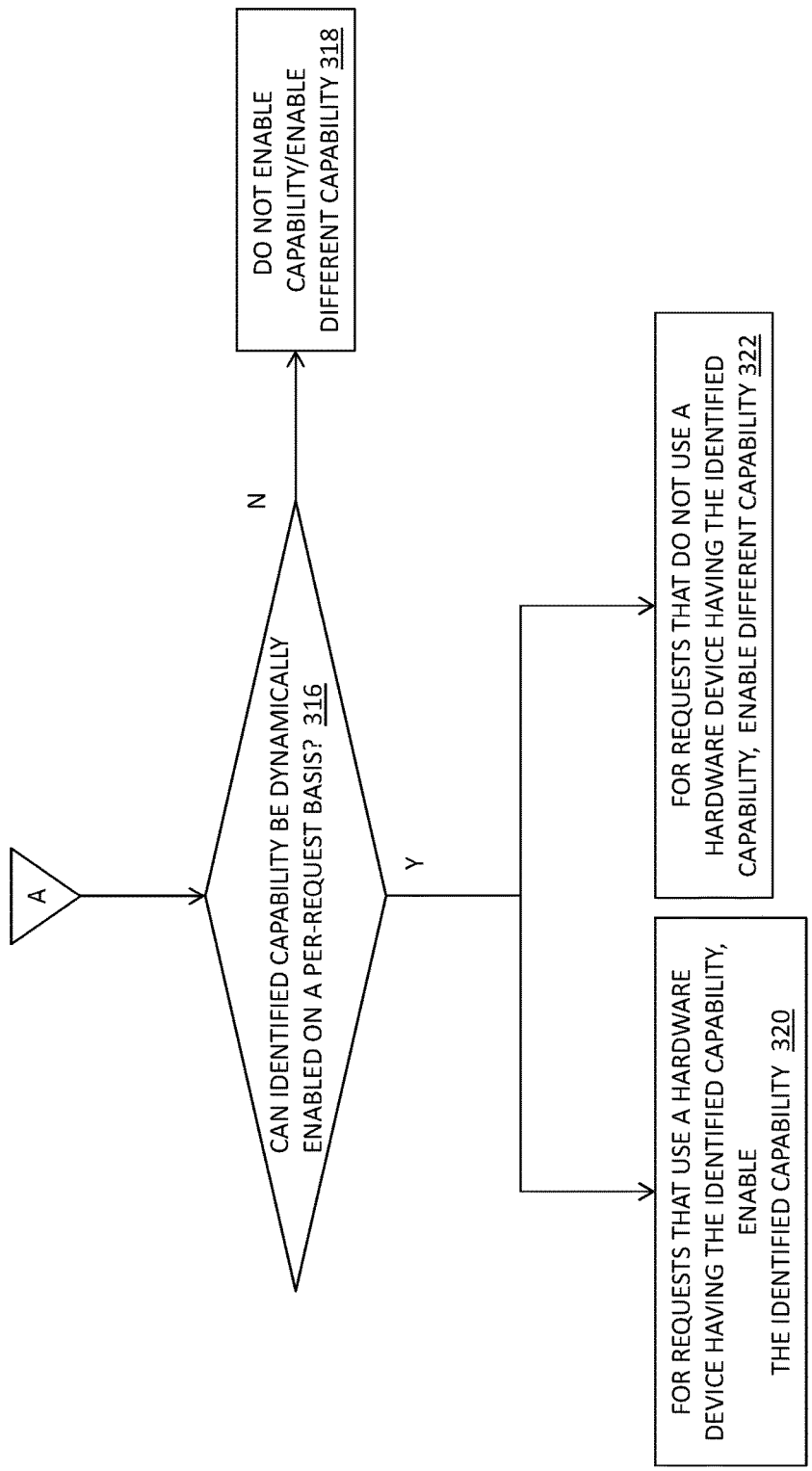

Turning now to FIGS. 3A-3B, a process for enhanced computer performance in an embodiment will now be described. The process of FIGS. 3A-3B assumes that a user of the system 200 has selected a capability with regard to the enablement of various hardware devices 218 based on different conditions. For example, the user may wish to maximize the data compression aspects with respect to the hardware devices 218 operating on the system for a given application. The user enters these preferences via the interface 214 and the preferences are stored as settings 216.

At block 302, the system 200 identifies the capability selected by the user through the interface 214, or alternatively from the settings 216. The capability may be selected by the user in various ways. For example, the capability may be a data compression ratio that is input or selected by the user via the interface. Alternatively, the capability may be selected by the user via the interface by entering the version identifier of the components that corresponds to the desired performance aspects.

At block 304, the system 200 determines a total number of hardware devices in the system. The hardware devices provide accelerated processing of data for applications executing via the computer system. At block 306, the system 200 determines from the total number of hardware devices, which of them have the identified capability (i.e., a total number of the hardware devices having the capability).

At block 308, the system 200 determines if the total number of hardware devices equals the number of hardware devices having the capability. If so, the system 200 enables that capability at block 310. Otherwise, if the system 200 determines that the total number of hardware devices does not equal the total number of the hardware devices having the capability (block 308), the system 200 then determines whether a high availability profile must be maintained at block 312. The high availability profile may be stored in the system memory 210, along with the settings 216. In an embodiment, a high availability profile can describe the amount of redundancy of hardware devices in the system 200 and/or a metric that defines a minimum performance value or threshold that is required in the system. For example, if a selected capability associated with a particular hardware device cannot be a single point of failure, then the availability profile may require that at least two of these hardware devices be available in the system during operation. Another example would be if for adequate performance, at least two hardware devices are required during operation, then the availability profile may require three hardware devices to be available in order to accommodate a single device failure.

If the high availability profile must be maintained, the process continues to FIG. 3B. Otherwise, the system 200 enables the capability and leverages only the subset of the hardware devices that provide the capability at block 314.

Turning now to FIG. 3B, if the high availability profile does need to be maintained at block 312, the system 200 determines if the identified capability can be dynamically enabled on a per-request basis at block 316. If not, the capability is not enabled at block 318. For example, instead of enabling the selected capability, a capability associated with a different version of the hardware device is enabled. Otherwise, for those requests that use a hardware device having the capability, the system 200 enables the capability at block 320. By contrast, for those requests that do not use a hardware device having the capability, the capability is not enabled at block 322. For example, instead of the selected capability being enabled, a different capability may be enabled based on an earlier version of the hardware device.

Technical effects and benefits include the ability to configure various settings based on the various factors, such as hardware version identifiers, high-availability profile constraints, and capabilities that exist on a hardware device and are enabled through a software license.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method, comprising:
   determining a total number of the hardware devices having a capability indicating one or more performance aspects capable of being rendered by a hardware device of a computer system;
   upon determining that a total number of hardware devices in the system matches the total of the hardware devices having the capability, enabling the capability for each of the hardware devices of the computer system with respect to a corresponding performance aspect; and
   upon determining that the total number of hardware devices in the computer system does not match the total number of hardware devices having the capability, and upon determining that a high availability profile of the computer system is to be maintained, and upon determining that the identified capability cannot be dynamically enabled on a per-request basis, enabling a different capability attributed to respective hardware devices, the different capability based on an earlier version of the respective hardware device.

2. The method of claim 1, further comprising:
upon determining that the total number of hardware devices in the computer system does not match the total number of hardware devices having the capability, and upon determining that a high availability profile of the computer system need not be maintained, enabling the capability and leveraging only a subset of the hardware devices in the computer system that provide the capability.

3. The method of claim 2, wherein the high availability profile indicates at least one of a minimum redundancy of the hardware devices in the computer system and a metric that defines a performance value threshold.

4. The method of claim 1, further comprising:
upon determining that the total number of hardware devices in the computer system does not match the total number of hardware devices having the capability, and upon determining that a high availability profile of the computer system is to be maintained, and upon determining that the identified capability can be dynamically enabled on a per-request basis:
for requests that use hardware devices having the capability, enabling the capability; and
for requests that do not use hardware devices having the capability, enabling a different capability based on an earlier version of the respective hardware devices.

5. The method of claim 1, wherein capabilities of the hardware devices in the system are identified based on corresponding version identifiers.

6. The method of claim 1, wherein the hardware devices include an accelerator processor.

7. The method of claim 6, wherein the accelerator processor includes at least one of a data compression accelerator, a cryptographic accelerator, and a graphics accelerator.

8. A system, comprising:
a memory having computer readable instructions; and
a processor for executing the computer readable instructions, the computer readable instructions comprising:
determining a total number of the hardware devices having a capability indicating one or more performance aspects capable of being rendered by a hardware device of a computer system;
upon determining that a total number of hardware devices in the system matches the total of the hardware devices having the capability, enabling the capability for each of the hardware devices of the computer system with respect to a corresponding performance aspect; and
upon determining that the total number of hardware devices in the computer system does not match the total number of hardware devices having the capability, and upon determining that a high availability profile of the computer system is to be maintained, and upon determining that the identified capability cannot be dynamically enabled on a per-request basis, enabling a different capability attributed to respective hardware devices, the different capability based on an earlier version of the respective hardware device.

9. The system of claim 8, wherein the computer readable instructions further comprise:
upon determining that the total number of hardware devices in the system does not match the total number of hardware devices having the capability, and upon determining that a high availability profile of the system need not be maintained, enabling the capability and leveraging only a subset of the hardware devices in the system that provide the capability.

10. The system of claim 9, wherein the high availability profile indicates at least one of a minimum redundancy of the hardware devices in the system and a metric that defines a performance value threshold.

11. The system of claim 8, wherein the computer readable instructions further comprise:
upon determining that the total number of hardware devices in the system does not match the total number of hardware devices having the capability, and upon determining that a high availability profile of the system is to be maintained, and upon determining that the identified capability can be dynamically enabled on a per-request basis:
for requests that use hardware devices having the capability, enabling the capability; and
for requests that do not use hardware devices having the capability, enabling a different capability based on an earlier version of the respective hardware devices.

12. The system of claim 8, wherein capabilities of the hardware devices in the system are identified based on corresponding version identifiers.

13. The system of claim 8, wherein the hardware devices include an accelerator processor, the accelerator processor including at least one of a data compression accelerator, a cryptographic accelerator, and a graphics accelerator.

14. A computer program product comprising a computer readable storage medium having program instructions embodied therewith, the program instructions executable by a processor to cause the processor to:
determining a total number of the hardware devices having a capability indicating one or more performance aspects capable of being rendered by a hardware device of the computer system;
upon determining that a total number of hardware devices in the system matches the total of the hardware devices having the capability, enabling the capability for each of the hardware devices of the computer system with respect to a corresponding performance aspect; and
upon determining that the total number of hardware devices in the computer system does not match the total number of hardware devices having the capability, and upon determining that a high availability profile of the computer system is to be maintained, and upon determining that the identified capability cannot be dynamically enabled on a per-request basis, enabling a different capability attributed to respective hardware devices, the different capability based on an earlier version of the respective hardware device.

15. The computer program product of claim 14, wherein the program instructions cause the processor to:
upon determining that the total number of hardware devices in the computer system does not match the total number of hardware devices having the capability, and upon determining that a high availability profile of the computer system need not be maintained, enable the capability and leveraging only a subset of the hardware devices in the computer system that provide the capability.

16. The computer program product of claim 15, wherein the high availability profile indicates at least one of a minimum redundancy of the hardware devices in the computer system and a metric that defines a performance value threshold.

17. The computer program product of claim 14, wherein the program instructions cause the processor to:

upon determining that the total number of hardware devices in the computer system does not match the total number of hardware devices having the capability, and upon determining that a high availability profile of the computer system is to be maintained, and upon determining that the identified capability can be dynamically enabled on a per-request basis:

for requests that use hardware devices having the capability, enable the capability; and for requests that do not use hardware devices having the capability, enable a different capability based on an earlier version of the respective hardware devices.

\* \* \* \* \*